Aug. 25, 1964  J. T. McNANEY  3,145,632
PRINTING APPARATUS
Filed Jan. 22, 1962  2 Sheets-Sheet 1

INVENTOR.
JOSEPH T. McNANEY
BY
ATTORNEY

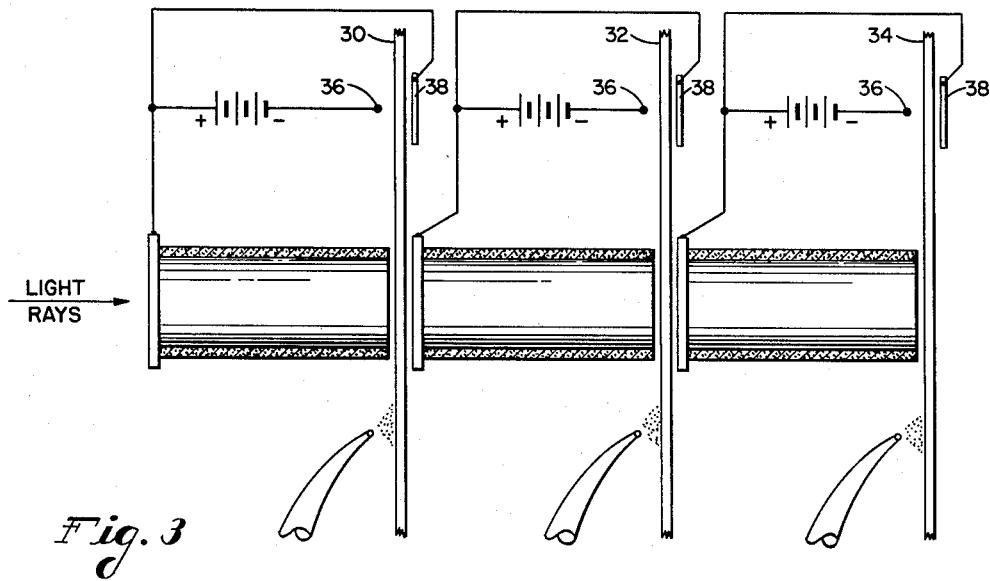
*Fig. 3*
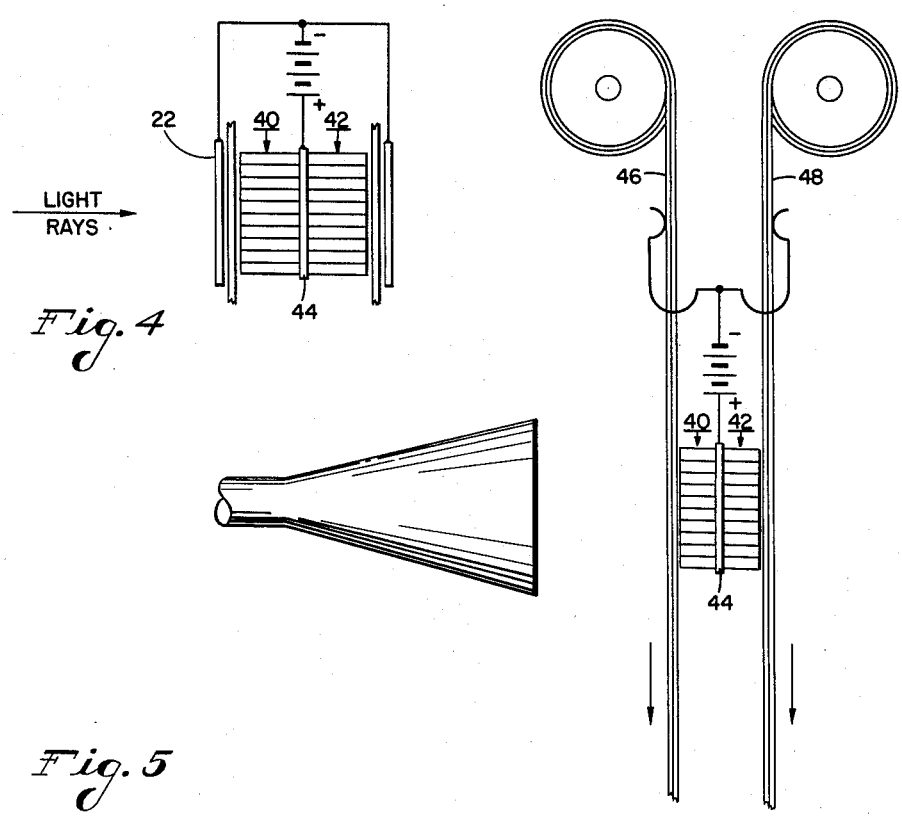
*Fig. 4*
*Fig. 5*

United States Patent Office 3,145,632
Patented Aug. 25, 1964

3,145,632
PRINTING APPARATUS
Joseph T. McNaney, 8548 Boulder Drive, La Mesa, Calif.
Filed Jan. 22, 1962, Ser. No. 167,508
9 Claims. (Cl. 95—1.7)

This invention relates to printing apparatus, and more particularly to electrostatic printing apparatus that produces a plurality of copies at one time.

It is well known that there is an increasing need for printing apparatus that produces multiple copies. Most prior art apparatus produced one copy at a time, and the process was then repeated for each copy desired. This procedure is not completely satisfactory.

It is therefore the principal object of my invention to provide a novel printing apparatus that produces a plurality of copies in one operation.

Figure 1:
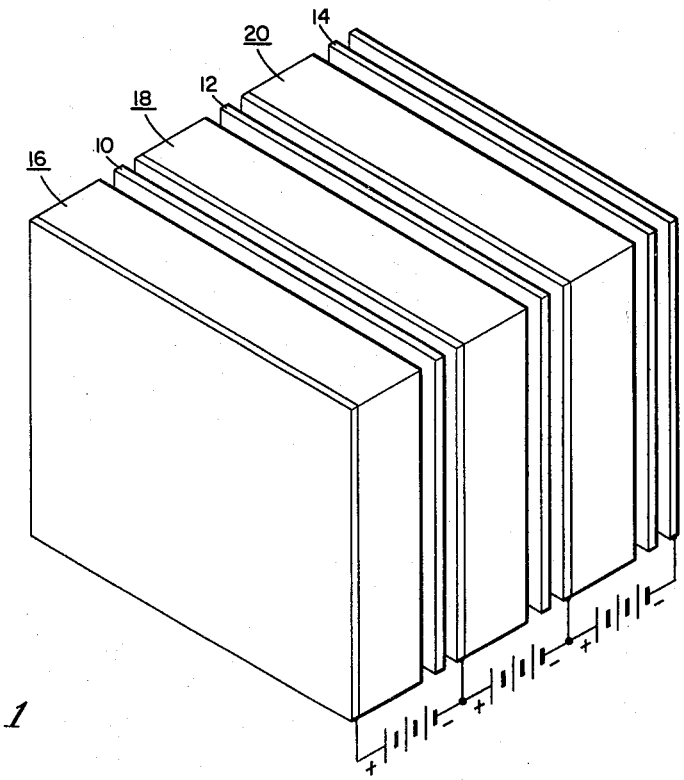
Figure 2:
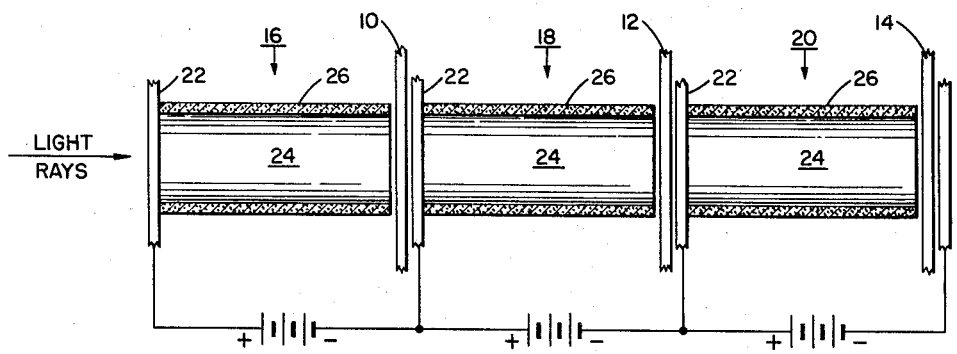

The attainment of this object and others will be realized from the following specification, taken in conjunction with the drawings of which:

FIGURE 1 shows the basic concept of my invention;
FIGURE 2 shows an enlarged fragmentary view of a portion thereof; and
FIGURES 3, 4, and 5 show other embodiments.

My invention uses the principle of electrostatic printing, wherein electrical charge patterns are produced on the surface of a material, and particles of a contrasting color are attarcted to the charge patterns to produce a visible display. The adhereing material may be "fixed" by suitable processes, or may be transferred to other media to be made into permanent copies.

My invention, as shown in FIGURE 1, uses a plurality of sheets 10, 12, and 14 of either transparnt or translucent recording media, onto which it is desired to print a message, picture, or other type of display. In operation the display to be copied is projected onto the front of a first printing structure 16; the display being produced by a cathode ray tube, by a projection of a light through a film or transparency, or by any other suitable means. As will be hereinafter explained in greater detail, structure 16 comprises an array of light guides which are characterized by the ability to receive light at one end thereof and to emit the light at the other end. Light guides having small diameters are known as optical fibers; and since their diameters may be as small as one or two-thousandths of an inch, they are capable of producing extremely small, closely spaced spots of light—a condition that is necessary for a high resolution picture. When the display is projected onto the front of structure 16, the light that forms the display enters selected ones of the bundled light guides, and appears on the back surface of structure 16. There the light traverses recording medium 10, and enters the light guides that comprise printing structure 18. This light is again transmitted through the bundled optical fibers and the transparent recording media 12, and enters the light fibers of structure 20. Here again the light traverses these light fibers and recording medium 14.

Simultaneously, in a manner to be later explained the transmittal of the light through the optical fibers produces a charge pattern on recording media 10, 12, and 14; and this charge pattern corresponds to the display produced by the incident light. The charge patterns are then developed by any of the well known electrographic printing processes.

It may therefore be seen that my invention provides a simultaneously plurality of substantially identical copies of the display that is projected onto the front surface of structure 16.

The method by which this result is accomplished will be apparent from a study of FIGURE 2. This fragmentary enlarged drawing shows the interrelationship of the various structures and recording media. As shown in FIGURE 2, the front of structure 16 has a transparent, electrically conductive film 22. The individual optical fibers 24 that comprise structure 16 are coated with a sleeve 26 of photoconductive material which, as is well known, reduces its electrical resistance when illuminated. Recording medium 10 is positioned adjacent the distal ends of the photoconductor clad optical fiber, and another film 22 of transparent conductive material is positioned on the front surface of structure 18. Structure 20 and any subsequent structures are the same as structures 16 and 18.

My invention operates as follows. Incident light rays impinge upon and traverse film 22, and enter selected optical fibers. During the transmission of the light through the first optical fiber, the multiple internal reflections of the light illuminate photoconductive sleeve 26, which thereupon reduces its electrical resistance. In this state its lowered electrical resistance permits the potential which is applied to coating 22 to appear at the distal end of the photoconductive sleeve 26. At this point an electrostatic field is produced between the end of the photoconductive sleeve and the next adjacent conductive coating 22, and an electrical field is produced. Since the recording medium 10 is positioned in this electrical field, it becomes charged by the resultant corona discharge. In this way, recording medium 10 has produced on its surface a charge pattern that corresponds to the incident light projected onto the front surface of structure 16.

Since recording medium 10 is transparent or translucent, the light that leaves the optical fibers of structure 16 is transmitted through recording medium 10, and enters corresponding fibers of structure 18. Here again the light causes selected photoconductive sleeves 26 to become conductive and assume their low resistance state, whereupon the potential again appears between the back surface of structure 18 and the conductive coating 22 on the front surface of structure 20. Since recording medium 12 is in this field, it too acquires a charge pattern as a result of the corona discharge; the charge pattern corresponding to that on recording medium 10 and the display projected onto the front surface of structure 16.

In a similar manner, recording medium 14 also receives an identical charge pattern; and this process may be repeated as long as the intensity of the light is high enough to cause the photoconductive sleeves to assume their low resistance state. The final recording medium may be backed up by an electrode, rather than a complete printing structure.

FIGURE 3 shows another embodiment of my invention that is shown symbolically. This embodiment uses recording media in the form of moving strips 30, 32 and 34. A corona discharge, which is initiated between electrodes 36 and 38, produces a uniform charge on the entire surface of each moving strip of recording medium. Since the recording media move downwards, only a single row of optical fibers is used—rather than an array. The uniformly charged surfaces of the recording media pass in front of the aligned optical fibers. Incident light enters the optical fibers as previously described, and in this case—instead of producing a charge pattern—the illuminated low resistance photoconductive sleeves set up an electrostatic field that permits selected charges to escape. As a result of this neutralization process, the surface of the recording media that emerges from the aligned optical fibers has charges on selected areas, in this way producing a charge pattern on the surface. This charge pattern may be "dusted," as symbolically shown, and the adhering particles then fixed developed, treated, or transferred to another recording medium to provide the final printed copy.

It may be seen that this embodiment, too, permits the simultaneous production of multiple copies, all of which are identical and correspond to the light pattern projected onto the front row of optical fibers.

FIGURE 4 shows another embodiment of my invention, this embodiment being particularly useful where only two copies are desired. Here two sets 40 and 42 of optical fibers have a common coating 44 of transparent electrically conductive material. Incident light traverses transparent electrically conductive film 22, and enters selected optical fibers of structure 40 to be transmitted as previously described. An electrostatic field is produced across each recording medium, as previously described, and the resultant corona charge produces a charge pattern.

This embodiment also may use the moving tape and neutralizaion technique described in connection with FIGURE 3.

FIGURE 5 shows another embodiment of my invention, this one using composite strips 46 and 48 of recording medium that comprise a strip of transparent conductive material and a strip of transparent recording medium. In the embodiment of FIGURE 5, the recording media pass the optical fiber structures 40 and 42, and light from a cathode ray tube is projected through transparent composite recording medium 46. Structure 40 produces electrostatic fields between the ends of selected optical fiber and the conductive coating on recording medium 46; and the resultant corona discharge produces a charge pattern on recording medium 46. Simultaneously the light causes a corresponding charge pattern to be produced on recording medium 48. The charge pattern may be treated by processes previously described.

The particular embodiment of the invention illustrated and described herein is illustrative only and the invention includes such other modifications and equivalents as may readily appear to those skilled in the art within the scope of the appended claims.

I claim:

1. A multiple copy printer comprising in combination: a plurality of serially positioned printing structures, each comprising bundled optical fibers whose ends form the front and back surfaces of said structures, each said fiber having a circumjacent photoconductive sleeve; a transparent electrically conductive coating positioned on the front surface of each said printing structures; strips of light transmitting recording media positioned adjacent the back surface of each said structure whereby said strips are adjacent the distal ends of the sleeves; means for applying a uniform charge on the surface of said recording mediums; and means for causing an electric field to occur at the distal ends of selected sleeves to neutralize portions of the uniform charge, and produce substantially identical charge patterns on the surfaces of each of said recording media, said electric field producing means comprising means for projecting light onto said front surface of the first said structure, said light passing through each of said printing structures in sequence.

2. A multiple copy printer comprising in combination: a plurality of serially positioned printing structures, each comprising bundled optical fibers whose ends form the front and back surfaces of said structures, each said fiber having a circumjacent photoconductive sleeve; a transparent electrically conductive coating positioned on the front surface of each said printing structure; strips of light transmitting recording media positioned adjacent the back surface of each said structures whereby said strips are adjacent the distal ends of the sleeves; means for applying a uniform charge to the surface of said recording mediums; and means for causing an electric field to occur at the distal ends of selected sleeves to neutralize portions of the uniform charge and produce substantially identical charge patterns on the surfaces of each of said recording media.

3. A multiple copy printer comprising in combination: a plurality of serially positioned printing structures, each comprising bundled optical fibers whose ends form the front and back surfaces of said structures, each said fiber having a circumjacent photoconductive sleeve; a transparent electrically conductive coating positioned on the front surface of each said printing structures; strips of light transmitting recording media positioned adjacent the back surface of each said structures whereby said strips are adjacent the distal ends of the sleeves; means for applying potentials between adjacent said coatings; and means for projecting light onto said front surface of the first said structure whereby said light causes a corona discharge to occur at the distal ends of selected sleeves, thus producing substantially identical charge patterns on the surfaces of each of said recording media, said light passing through each of said printing structures in sequence.

4. A printer comprising: a plurality of serially positioned printing structures, each said structure comprising a light collimator of bundled light guides having photoconductive sleeves on the longitudinal surfaces of said guides, the ends of said guides forming the front and rear surfaces of said structures, a transparent conductive coating on said front surfaces of said structures; a source of potentials connected to said coatings; sheets of light transmitting recording medium positioned between the back surface of each structure and the front surface of the subsequent structure; said printing structures permitting light projected onto said front surface of said first structure to traverse said coating, enter selected said light guides, illuminate associated said photoconductive sleeves which therefore reduces their resistance, and traverse said recording medium to enter subsequent light guides, said reduced resistance of said photoconductive sleeves producing across said recording mediums simultaneous and identical electric fields corresponding to the pattern of impinging light.

5. A printer comprising: a plurality of serially positioned printing structures, each said structure comprising bundled light guides having circumjacent photoconductive sleeves, the ends of said guides forming the surfaces of said structures; a transparent conductive coating on one surface of said structures; sheets of light transmitting recording medium having one surface thereof positioned adjacent the other surface of each structure; an electrode adjacent the other surface of said sheet of recording mediums; a source of potentials connected between said coatings and said electrodes; means for directing light upon selected said light guides, said light traversing said recording mediums and selected said light guides for reducing the resistance of said sleeves to cause said potentials to produce substantially identical electric fields across each of said sheets of recording medium corresponding to the pattern of impinging light.

6. A printer comprising: a plurality of serially positioned printing structures, each said structure comprising bundled light guides having circumjacent photoconductive sleeves, the ends of said guides forming the surfaces of said structures; a transparent conductive coating on one surface of said structures; sheets of light transmitting recording medium having one surface thereof positioned adjacent the other surface of each structure; a source of potential applied to said coating; means for directing light upon selected said sleeves, said light traversing said recording mediums and selected said light guides for reducing the resistance of said sleeve to cause said potential to produce substantially identical electric fields across each of said sheets of recording medium corresponding to the pattern of impinging light.

7. A multiple printer comprising: two serially positioned printing structures, each comprising bundled light guides having circumjacent photoconductive sleeves on their longitudinal surfaces, the ends of said guides forming the front and back surfaces of said structures; a common transparent electrically conductive layer positioned on the back surface of one said structure and on the front surface of the other said structure; means for applying a potential to said conductive layer; means for positioning a sheet of light transmitting recording medium adjacent the other surfaces of said structures; means for directing a pattern of impinging light onto said printer, said light entering selected light guides and illuminating their associated photoconductve sleeves to permit said potential to produce substantially identical electric fields across each of said recording mediums adjacent the distal ends of said illuminated sleeves.

8. The combination of claim 7 including electrodes positioned adjacent the other sides of said recording mediums; and means for applying a potential to said electrodes.

9. The combination of claim 7 wherein said recording medium comprises a conductive film; and means for applying a potential to said film.

References Cited in the file of this patent

UNITED STATES PATENTS

| | | |
|---|---|---|
| 2,962,374 | Dessauer | Nov. 29, 1960 |
| 3,007,049 | McNaney | Oct. 31, 1961 |
| 3,057,275 | Walkup et al. | Oct. 9, 1962 |